Dec. 22, 1964 C. A. ANDREWS 3,162,840

ELECTRONIC DATA PROCESSING MACHINE CONTROL

Filed June 6, 1960 4 Sheets-Sheet 1

INVENTOR
CARROLL A. ANDREWS
BY Edgar H. Kent
ATTORNEY.

Dec. 22, 1964 C. A. ANDREWS 3,162,840

ELECTRONIC DATA PROCESSING MACHINE CONTROL

Filed June 6, 1960 4 Sheets-Sheet 4

United States Patent Office 3,162,840

Patented Dec. 22, 1964

3,162,840

ELECTRONIC DATA PROCESSING MACHINE CONTROL

Carroll A. Andrews, Poughkeepsie, N.Y., assignor to International Business Machines Corporation, New York, N.Y., a corporation of New York Filed June 6, 1960, Ser. No. 34,164

13 Claims. (Cl. 340—172.5)

This invention relates to electronic data processing machines of the stored program type and more particularly to new and improved program responsive data processing machine control arrangements.

The operations of electronic data processing machines of this type to which this invention relates are controlled by a program of instructions which is stored in a memory. The instructions are read from memory one at a time, are decoded and then by means of command generators channel signals throughout the machine to appropriately control the operation thereof. Generally instructions may be of the arithmetic manipulating type which involve control of the operation of the arithmetic unit of the computer or of the nonarithmetic manipulating type in which only general control operations within the machine are performed.

In typical computer control arrangements an instruction is decoded and the command generator is set. The command generator is then strobed by timing pulses and generates commands which initiate and control the specific operations required in the performance of the instruction. In ordinary machine operations only one instruction is processed at a time. As the instructions which manipulate data in the arithmetic element of the machine require at least two machine cycles for completion, there are intervals during which certain portions of the computer on the machine circuitry are not operating due to the nature of the instruction.

Further, in conventional data processing machine control arrangements, an instruction decoder, in response to an instruction supplies D.C. levels to command gates which are strobed by timing pulses. During the resolution time of the decoder no commands can be generated since the levels applied to the command gates are changing during that time. If it is desired that the commands be generated on each timing pulse the resolution time of the decoder must be less than the time interval between timing pulses. Decoders, however, typically comprise a series of cascaded arithmetic circuits, each of which may be capable of resolving during less than one timing pulse, but, since they are cascaded, the total resolution time delay is greater than the interval between timing pulses.

A principal object of the invention is to provide a novel data processing machine control arrangement which enables the simultaneous processing of a plurality of instructions at a high rate of speed.

Another object of the invention is to provide a new and improved computer control arrangement capable of enabling continuous computer operation.

Another object of the invention is to provide a new and improved computer control arrangement which utilizes magnetic elements as the principal control devices.

Still another object of the invention is to provide a novel and improved instruction decoding arrangement which is arranged so that every time pulse of a high speed computer may be utilized to generate commands.

Another object of the invention is to provide an instruction decoding and command generation system which permits multilevel decoding and overlapped memory operation.

Still another object of the invention is to provide a system for decoding instructions and generating commands which utilizes magnetic elements and permits the generation of commands on each time pulse.

The system disclosed herein distinguishes between arithmetic manipulating instructions and instructions of the nonarithmetic manipulatnig type, and is arranged so that both types may be processed concurrently. In addition the system employs command generator arrangements whereby one or more commands may be generated by each timing pulse. The system includes a magnetic matrix decoder which is conditioned by signals from an instruction register representative of an instruction. The register has been set by signals from a program memory buffer register which is utilized as a second instruction storage device. The signals, applied from the instruction register to the decoder, set a single magnetic element in that decoder to a first magnetic state and that element, when changed to a second state, generates an output signal which is amplified and applied to set an associated row of magnetic elements in a command generator matrix to a corresponding first magnetic state. A timing ring changes the states of the set elements in the matrix one by one and each resetting operation generates one or more command pulses. In the preferred embodiment of the invention the magnetic elements of both the decoder and the command generator are tape cores with sense windings on which the output signals and commands are generated. A plurality of sense windings may be placed on any one core in the command generator so that more than one command can be issued at one time, and each command sense winding may be connected in series through several command generator elements so that that command will be issued by all the instructions that require that command at various times. The command generator is divided into a plurality of units, and only the first unit is set by the signal from the instruction decoder. The associated group of cores in the second unit is set by a signal that issues from the first unit, and thus the commands can be generated on all timing signals without delay to allow resolution.

The circuitry may be arranged so that a command, generated at the completion of the instruction, resets the timing ring so that the instruction cycle may be of variable length. A transistor driver is utilized between the decoder and the command generator and the units of the command generator to provide power gain and isolation.

In a more complex embodiment of the system two command generator matrices are associated with a single instruction decoder matrix. The instructions are divided into two classes (A and B), each class utilizing different commands. Two core reset drivers are associated with the instruction decoder, one resetting magnetic elements associated with instructions of class A and the other resetting elements associated with class B instructions. Each instruction is set into the command generator of the associated class and sets a row of elements in that generator which the timing ring sequentially resets to generate commands. One of the first commands issued reads the next instruction into the instruction decorder matrix to set an element therein. Subsequently a command is issued to generate a reset level of the other class, and if the instruction set into the decorder matrix is of that class the element will be reset, generating an output signal which sets the associated row of elements in the associated command generator matrix. The timing ring then sequentially resets those elements to generate commands of that instruction. Thus, commands associated with both types of instructions could be generated simultaneously. The embodiment of the invention hereinafter described segregates instructions into two classes and utilizes two level command generators so as to enable the generation of commands on every timing pulse of the computer. Thus an efficient data processing machine control system is provided.

Other objects and advantages of the invention will be seen as the following description of a preferred embodiment thereof progresses in conjunction with the drawings, in which.

Figures 1, 2:
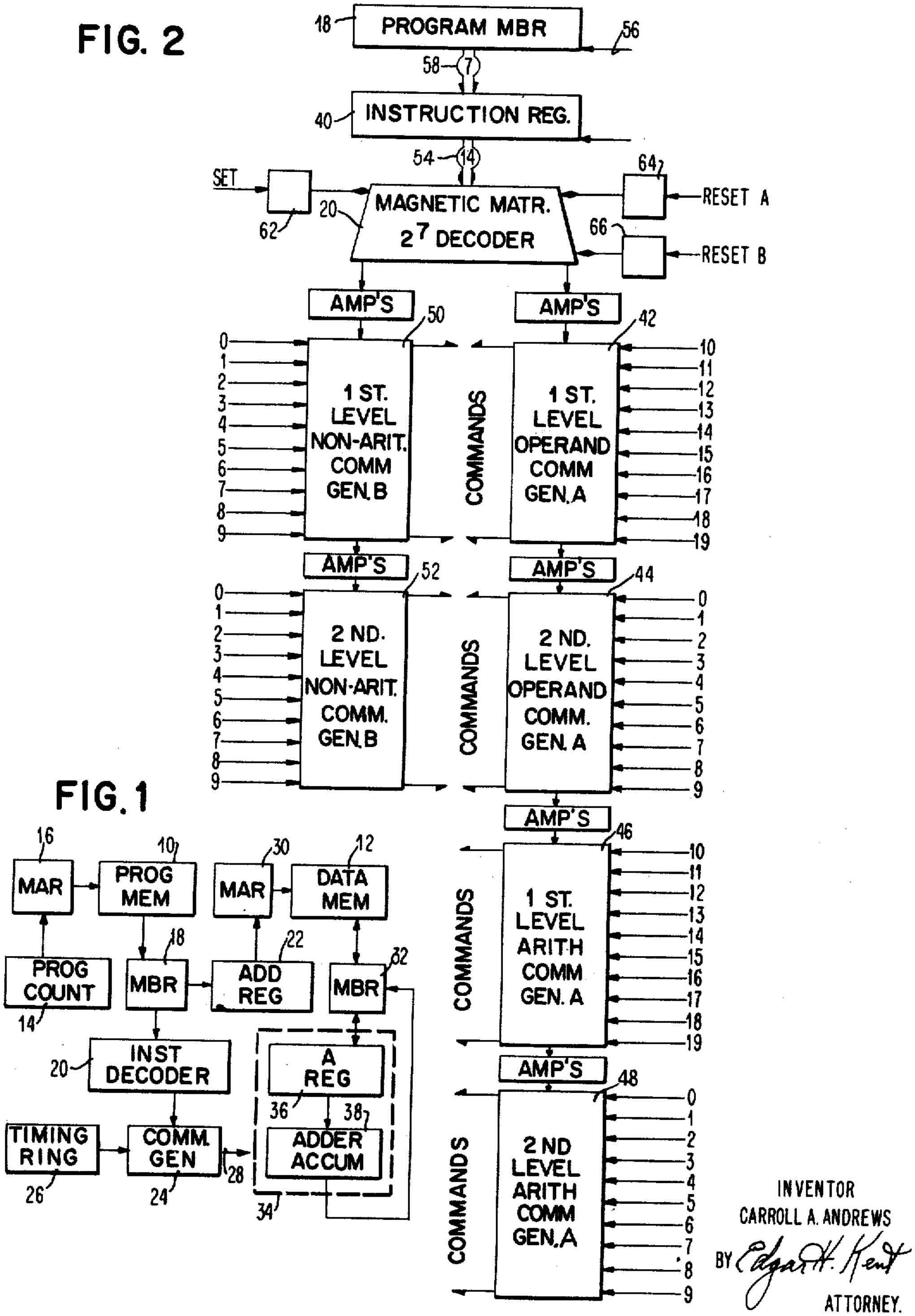
FIG. 1 is a block diagram of electronic data processing machine which incorporates apparatus of the invention.
FIG. 2 is a block diagram of the control element according to the preferred embodiment of the invention showing two sets of command generators, one associated with arithmetic instructions, and the other with nonarithmetic instructions, and associated instruction decoder circuitry.

There is shown in FIG. 1 a block diagram of principal computer components of the machine which incorporates the invention. In this machine the instructions in binary coded form are stored in program memory 10 and data, similarly in binary coded form, is stored in data memory 12. An instruction is read from memory in accordance with signals applied from a suitable source such as a program counter 14 via memory address register 16. The instruction is initially stored in a memory buffer register 18, and subsequently an operand portion thereof is transferred to an instruction decoder 20 with an address portion thereof being transferred to address register 22. The operand portion is decoded and sets elements in the command generator 24 which are sampled by signals from timing ring 26 to generate commands on lines 28 for controlling computer operations. If the instruction is of the arithmetic type the address portion of the instruction, stored in address register 22, is transferred through memory address register 30 to data memory to read a word from the specified address. That data is transferred through the memory buffer register 32 to the arithmetic unit 34 which shown as consisting of an A register 36 and an adder/accumulator 38. Manipulation of the data word in the arithmetic unit is controlled by commands which issue from the command generators 24.

The disclosed computer utilizes a machine cycle of twenty timing pulses. The read cycle of the data memory 12 is ten timing pulses in length (during the period 0–10), and the read cycle of the program memory 10 is five timing pulses in length and occurs during the periods 5–10 and 15–0 of each machine cycle. The system is arranged to permit the concurrent processing of three instructions where arithmetic instructions utilize two machine cycles and nonarithmetic instructions one machine cycle.

The instruction decoding and command generation circuitry is shown in block form in FIG. 2. In that figure there is shown a program memory buffer register 18, and instruction register 40, an instruction decorder 20, and six command generator units 42–52. All of these devices are composed of magnetic core elements with the exception of the instruction register 40 which is composed of flip-flops that supply conditioning levels over lines 60 to the magnetic elements in the decoder matrix 20. The magnetic core elements may be composed of any square loop material, a type 4–79 Molybdenum Permalloy tape wound core being a suitable example of such broad class of cores. The seven bit operand portion of an instruction word, transferred in parallel to the program memory buffer register, switches certain cores therein from a first to a second magnetic state. A reset pulse applied on line 56 then switches those cores in the program memory buffer register back to their original magnetic state, generating output pulses on certain of lines 58 which set the associated flip-flops in the instruction register 40. The output levels of the flip-flops in the instruction register are applied to the instruction decoder 20 over lines 54. Associated with the instruction decoder is a "setting" flip-flop 62 and two "resetting" flip-flops 64 and 66. Flip-flop 64 is designated a class A reset flip-flop and flip-flop 66 is designated a class B reset flip-flop, where class A instructions are of the arithmetic type and class B instructions are of the nonarithmetic type.

Figures 3, 4:
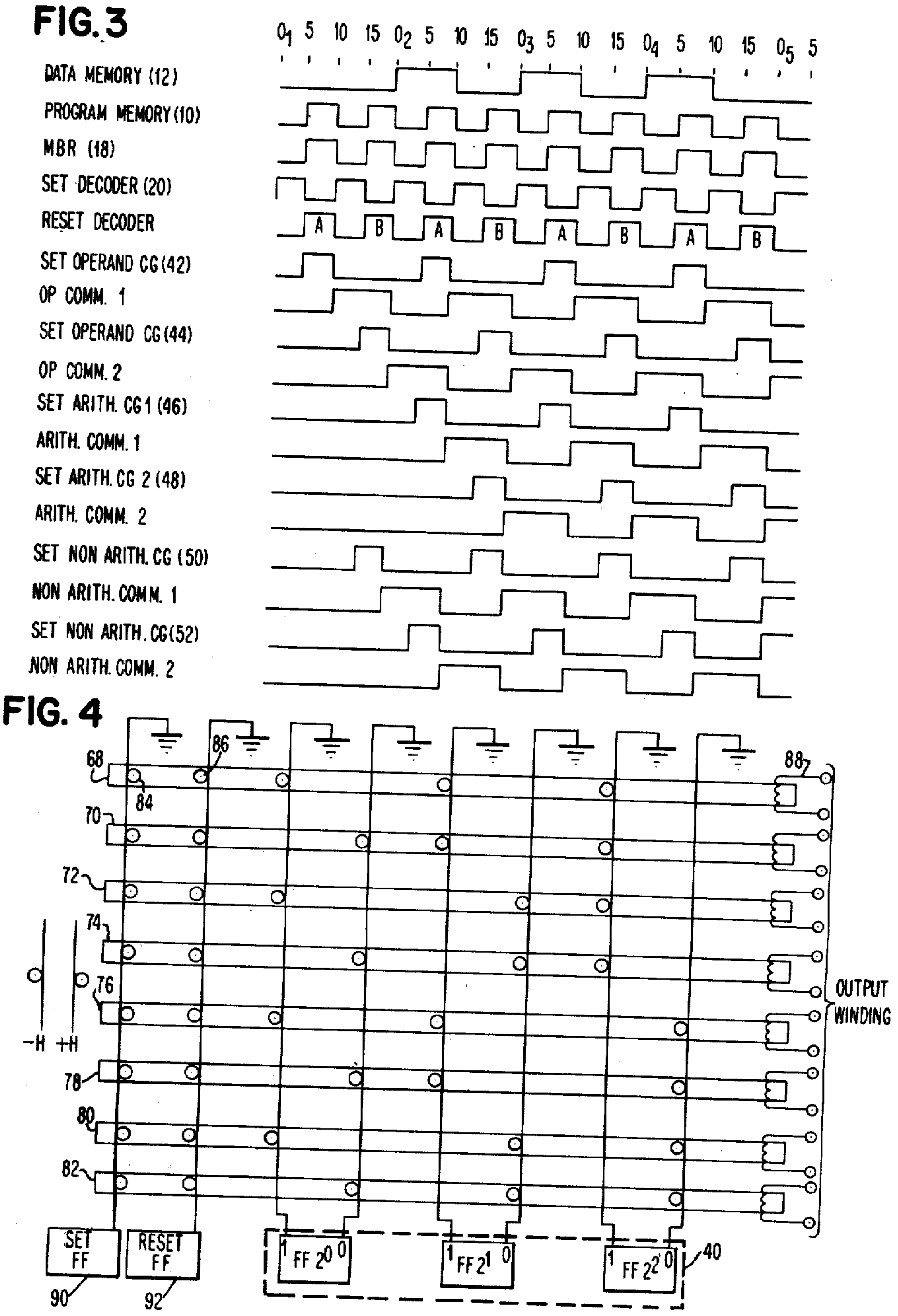
FIG. 3 is a timing chart illustrating certain operations of the circuitry shown in FIG. 2.
FIG. 4 is a diagrammatic view of the instruction decoder matrix illustrating the magnetic elements employed therein.
Figure 5:
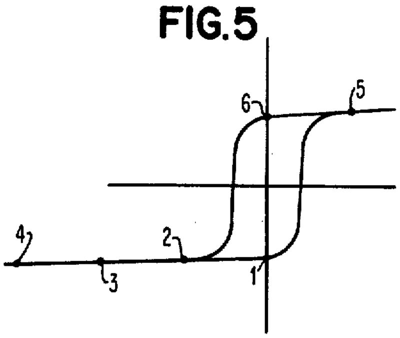
FIG. 5 is a diagrammatic illustration of the hysteresis loop of a magnetic element utilized in the decoder shown in FIG. 4.

The instruction decoder 20 is shown in simplified form in FIG. 4 as a three-bit decoder. Eight cores, 68 through 82 are utilized in the decoder, and on each core there is a set winding 84, a reset winding 86, a winding corresponding to each of the bits in the instruction word that is to be decoded and an output winding 88. The set windings are connected in series and are conditioned by an output level from flip-flop 90 which corresponds to the flip-flop 62 in FIG. 2. The windings 84 are positioned on the core so that the output level from flip-flop 90 drives all the cores in a positive direction of M.M.F. A typical hysteresis (B–H) loop of the cores utilized in the decoder is shown in FIG. 5. As indicated in FIG. 4, each of the outputs from the flip-flops of the instruction register 40 drives the cores associated with it in a negative direction of M.M.F. Thus the condition of the cores may be at points 1, 2, 3 or 4 as indicated in FIG. 5. An output level from flip-flop 90 is then applied to the cores and drives them in a positive direction of M.M.F. equal to the M.M.F. drive from one instruction register flip-flop winding. The only core which will be switched to positive saturation (point 5) will be the one core which has no bias current flow in it and was at a negative remanence position (point 1). For example, if all the instruction register flip-flops are in the ONE state all cores except core 82 will have negative bias current flowing through their windings. Core 82 is at the point of negative remanence. When the set level is applied only that core will be switched to positive saturation (point 5), and when a reset level is subsequently applied by flip-flop 92 to all the cores, driving them negatively in a unit of M.M.F., the only core switched will be core 82 and an output signal will be induced in its associated output winding 88.

Figure 6:
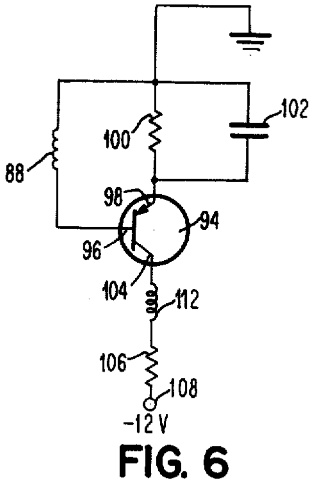
FIG. 6 is a schematic diagram of the transistor amplifier utilized in the preferred embodiment of the invention.

This output is applied through a sense amplifier to set a row of cores in the command generator. This sense amplifier is shown in FIG. 6 and comprises a single Raytheon 2N428 transistor 94. The sense or output winding 88 is connected between the base electrode 96 of that transistor and ground. The emitter electrode 98 is grounded through a 7.5 ohm resistance 100. A 0.05 capacitance 102 is connected in parallel with resistance 100 and provides a faster turn off time of the transistor. The collector electrode 104 is connected through the associated core winding such as winding 112 (FIG. 8) and a 30 ohm resistance 106 to a −12 volt source at terminal 108. Thus the collector current will pass through the core winding to set the associated row of cores in the command generator.

Figures 8, 8A:
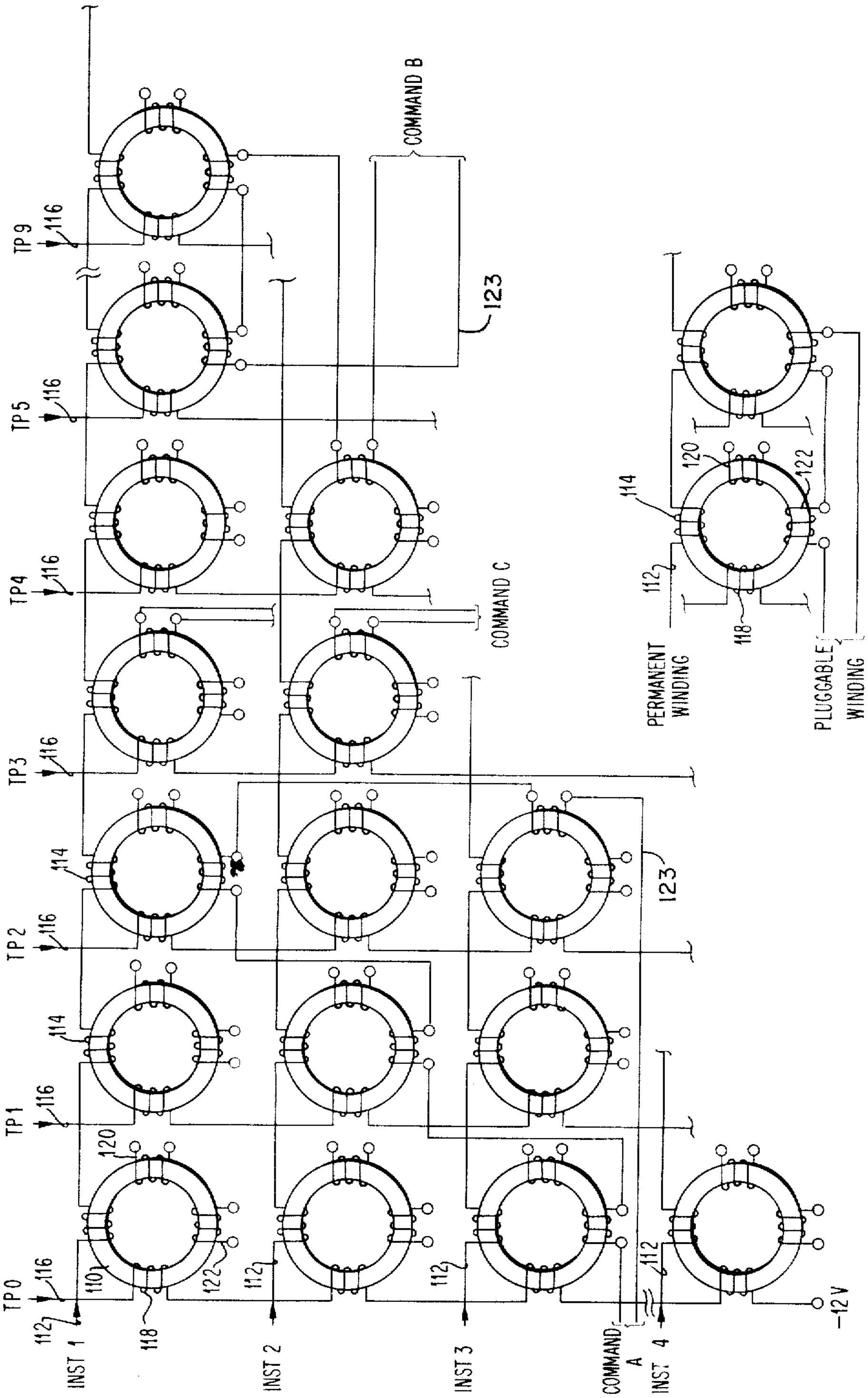
FIG. 8 is a schematic diagram of a command generator constructed in accordance with the invention.
FIG. 8*a* is a diagram illustrating certain details of two command generator elements and their associated windings.

A typical unit arrangement of command generator core elements 110 is shown in FIG. 8. As indicated in that figure, the cores are aligned in columns and rows. A horizontally illustrated conductor 112 is associated with the permanent winding 114 with each row of cores and another vertically illustrated conductor 116 is associated with a permanent winding 118 of the core elements in each column. Each core has two additional windings 126, 122 to which pluggable connections may be made as illustrated by the cores shown in FIG. 8*a*. The pulse output from the decoder 20 is applied to the associated horizontal conductor 112 and sets each core in the associated row. The cores are then sequentially reset, column by column, by timing pulses applied on the vertical conductors 116, and the resultant changes of flux generate output pulses in their sense windings 126, 122 to provide command signals. The sense windings may be variously connected to command lines 123 by pluggable connections to provide command signals at the desired times during each instruction. As illustrated, command A will be generated during instruction 1 at TP 2 time, during instruction 2 at TP 1 time and during instruction 3 at TP 0 and 2 times. Command B will be generated in instruction 1 at TP 5 and 9 times and in instruction 2 at TP 4 time. Command C, which may be used to set cores in the following command generator unit, for example, is generated at TP 3 time in each instruction. The additional windings are provided so that more than one command may be generated at any one time during one instruction. Although only one such additional winding is indicated on each core a plurality of them may be utilized to provide the possibility of generating a corresponding plurality of commands by one timing pulse which resets a single core. The pluggable connections permit the command wiring to be easily adjusted for various instructions. Thus the flexibility of this command generator is substantial and as the rewiring of the command generator matrix is a comparatively simple operation the system permits the computer program to be easily adapted for different problems.

Figure 7:
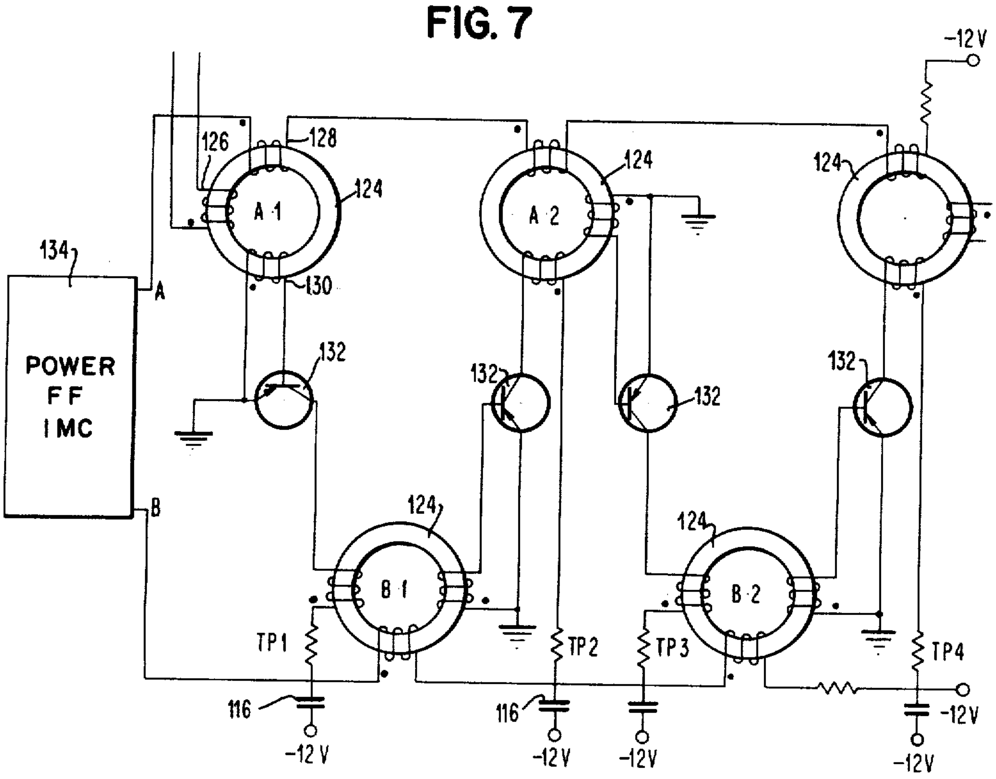
FIG. 7 is a schematic diagram of the timing pulse generator utilized in the preferred embodiment of the invention.

The preferred embodiment of the timing ring utilized in conjunction with the command generator units is shown in FIG. 7. In that arrangement there are provided two rows of cores 124, row A and row B. Each core has a priming winding 126, a reset winding 128 and an output winding 130. A transistor amplifier 132 connected in common emitter configuration is connected between the output winding of each core and the priming winding of a core in the other row. A power flip-flop 134 operable at a one megacycle pulse repetition frequency applied pulses (negative M.M.F.) to the resetting windings 128 of the rows alternately. Initially core A1 is set to positive remanence by a pulse applied to its priming winding 126. As the reset signal is applied to the row A cores the resetting of core A1 induces a signal in its output winding 130 which is applied to the high current transistor amplifier 132. The pulse forward biases the transistor emitter base junction and turns it on so that an amplified pulse is applied to the output line 116 to prime core B1 and to reset at time TP 1 the cores in the command generator matrix that are driven on that line. The next pulse from the power flip-flop 134 is applied to row B and resets the core B1 such that core A2 is primed and a resetting pulse is applied to command generator cores at time TP 2.

In summary, a row of cores in a command generator unit is set when an associated core in an earlier unit or the decoder is reset and this row of cores is reset sequentially by pulses from the timing ring to generate the requisite commands.

Operation of the system shown in FIG. 2, which is a preferred arrangement of these units, may be understood with reference to the timing diagram shown in FIG. 3. It will be assumed that the first instruction has been read from program memory and into the memory buffer register 18 during the interval TP 15–0 of the previous cycle. As mentioned previously the data memory is read during the interval TP 0–10 and the program memory is read during the intervals TP 5–10 and TP 15–0 of each machine cycle. At the time TP $0_1$ a pulse is applied to the memory buffer register 18 on line 56 and causes the generation of signals on lines 58 to set certain of the flip-flops in the instruction register 40 in accordance with the first instruction. The set level from flip-flop 62 is also applied to the decoder during this time. During the interval TP $5_1$–$10_1$ the level from the reset A flip-flop 64 resets the single decoder core that is at positive remanence and generates a signal which is applied through a transistor amplifier to set a corresponding row of cores in the first level command generator 42. At this same time the second instruction (a class B instruction) is being read from the program memory into the memory buffer register. The associated timing ring then applies timing pulses to command generator 42 which sequentially reset cores in that row to generate commands which initiate and control the requisite operation of the computer in accordance with the instruction. The instruction stored in the memory buffer register is read into the decoder during the interval TP $10_1$–$15_1$. During the interval TP $15_1$–$0_2$ the resetting of a core in command generator 42 applies a signal through the associated amplifier to set a row of cores in the second level command generator 44. Also during this same interval a class B reset level is applied to the decoder 20 and if the instruction then stored in register 40 is a class B instruction the set core is reset and a signal is applied through the associated amplifier to set a row of cores in the first level nonarithmetic command generator 50. During this interval the third instruction is also read from the program memory buffer register 18. Commands are then generated by timing pulses TP $0_2$–$9_2$ from both command generator 44 and command generator 50. During this interval the word specified by the address portion of the first class A instruction is read from the data memory 12 into its memory buffer register 32 and during the interval TP $5_2$–$10_2$ the next class B instruction is read from program memory 10 into the memory buffer register 18, the class A reset level is applied to the decoder 20 to read the third instruction into command generator 42, the resetting of a core in command generator 44 generates a pulse which is amplified and sets a corresponding row of cores in arithmetic command generator 46 and the resetting of a core in nonarithmetic command generator 50 generates a signal which sets an associated row of cores in nonarithmetic command generator 52. Timing pulses TP $10_2$–$19_2$ then reset cores in command generators 42, 46 and 52, thereby generating commands which relate to three distinct instructions.

During the interval TP $10_2$–$15_2$ the contents of the memory buffer register (the fourth instruction—a class B instruction) are transferred to the decoder to set the decoder. During the interval TP $15_2$–$0_3$ the reset B level is applied to read that instruction from the decoder, and instruction signals are transferred so that command generators 44, 48 and 50 are set. Thus TP $0_3$–$9_3$ generate commands relating to two class A instructions and one class B instruction.

The operation of the controlling apparatus continues to follow this general pattern as indicated by the timing diagram of FIG. 3. The cycle as indicated in FIG. 3 is contingent, however, upon the proper arrangement of the program to provide alternate class A and class B instructions. If the requirements of the program do not permit this arrangement of instructions the circuitry nontheless will process each class of instructions at the same rate as before, the command generators associated with the unused instructions being unoperative during the intervals that they are indicated active in FIG. 3.

The program counter 14, which specifies the next instruction to be read from program memory 10, is stepped when an instruction is read from the decoder 20. However if the instruction stored in the decoder is of the wrong class so that a command generator is not set a signal indicative of this fact is automatically generated and applied to clear the memory buffer register 18 and the program counter is not stepped. Thus the core in the decoder 20 remains set. No instruction is transferred from the memory buffer register 18 to the decoder during the next sensing operation but the same instruction is loaded into the memory buffer register for transfer during the succeeding cycle. This operation will not occur if the instruction program is in the order ABABAB but the requirements of the problem being handled may dictate deviation from such a program order.

The arrangement of command generator units may be modified in accordance with the exigencies of the computer and problems to which it is applied. For example, the nonarithmetic command generators 50 and 52 may be omitted where the program employed utilizes mainly instructions of the arithmetic type. In these and other arrangements the command generators may be arranged so that the resetting of cores therein provide signals indicative of the termination of the instruction, those signals may be utilized to generate a rest pulse to read a subsequent instruction from the decoder and also to appropriately reset the timing pulse generator. It will be noted, of course, that if a command resets the timing ring before the end of the normal operation of that ring the resetting pulse must also inhibit the next pulse that would have been generated. Thus the system provides easy adaptability to variable length instructions.

Another advantage of the system is the ease in which the program changes can be made. Each of the output windings in the command generator matrix units has pluggable connections and in changing a command it is only necessary to make the appropriate wiring change in the pluggable connections of the command generator core matrix. Thus there is provided a versatile program element in which only the immediately desired instructions need be wired in and in which instruction changes and improvements can easily be made.

While a preferred embodiment of the invention has been shown and described it will be understood that the invention is not intended to be limited to that specific embodiment or to details thereof and departures may be made therefrom within the spirit and scope of the invention, as defined in the claims.

I claim:

1. In an electronic data processing machine operative to process binary coded data in a series of repetitive machine cycles in accordance with a stored program of instructions, each instruction including an operand portion represented by a plurality of binary signals, machine controlling apparatus including means to generate a predetermined series of timing signals in each said machine cycle, a command generator unit divided into two sections, said command generator unit being arranged to generate, in response to the application thereto of an instruction signal and a series of said timing signals, the command signals required for execution by said machine of that instruction, means to apply a first consecutive group of said predetermined timing signals to the first command generator section in each machine cycle, means to apply a second consecutive group of said predetermined series of timing signals to the second command generator section in each machine cycle, means responsive to a signal generated during said first group of signals to transfer a signal representing an instruction to said second command generator section, and means responsive to a signal generated during said second group of signals to transfer a signal representing a next instruction to be processed by said machine to said first command generator section.

2. The apparatus as claimed in claim 1 and further including an instruction decoder comprising a plurality of magnetic elements, said magnetic elements when switched from a first to a second magnetic state being adapted to generate an output signal for conditioning a first section of said command generator unit to generate commands required for execution of an instruction, means to place a unique one of said magnetic elements in a first magnetic state in response to said instruction, and means to switch said magnetic elements from said first state to said second state.

3. The apparatus as claimed in claim 1 wherein said unit comprises a multiplicity of bistable magnetic elements arranged in columns and rows, the instruction signal applied to each section placing a row of elements in said section in a first magnetic state, said timing pulse applying means sequentially applying timing pulses to said columns to place the elements therein in second magnetic states, said elements when switched from said first to said second magnetic states generating command signals for the execution of the instruction.

4. The apparatus as claimed in claim 3 wherein the magnetic elements in said command generator unit are magnetic core elements, each having a plurality of windings thereon, the cores in each row having similar first windings connected in series by first conductors so that all the cores in a row are set to a first magnetic state in response to an instruction signal on one of said first conductors, the cores in each column having similar second windings connected in series by second conductors so that all the cores in a column are placed in a second magnetic state by a timing pulse signal applied to a second conductor by said timing pulse generation means, and an output winding on each core in which a command signal is induced when the core is changed from said first magnetic state to said second magnetic state.

5. The apparatus as claimed in claim 3 wherein said timing pulse generation means comprises two rows of magnetic elements, means to initially set one of said elements to a first magnetic state, and means to apply signals to said rows alternately adapted to switch said elements to a second magnetic state, an element when switched from the first to the second magnetic state being adapted to generate an output timing pulse and to set an element in the other row to the first magnetic state.

6. In an electronic data processing machine operative to process binary coded data in a series of repetitive machine cycles in accordance with a stored program of instructions, said instructions including two different classes and each instruction including an operand portion represented by a plurality of binary signals and a signal identifying its class, machine controlling apparatus including means to generate a predetermined series of timing signals in each said machine cycle, two command generator units, each said command generator unit being arranged to generate, in response to the application thereto of an instruction signal and a series of said timing signals, the command signals required for execution by said machine of that instruction, means to apply said predetermined series of timing signals to each command generator unit in each machine cycle, means for sensing the instructions in said program in a predetermined sequence, and means for transferring signals representing each said sensed instruction to one of said command generator units as a function of its class signal, including means for transferring each signal representing an instruction of a first class to one command generator unit during a first portion of said machine cycle and each signal representing an instruction of the second class to said other command generator unit during a second portion of said machine cycle.

7. The apparatus as claimed in claim 6 and further including an instruction decoder comprising a plurality of bi-stable magnetic elements, each said magnetic element, when switch from a first magnetic state to a second magnetic state, being adapted to generate an output signal for application to one of said command generator units, means to place a unique one of said magnetic elements in a first magnetic state in response to the application of binary signals representative of an operand portion of an instruction thereto, and wherein said signal transferring means includes means to switch said one magnetic element from said first magnetic state to said second magnetic state.

8. The apparatus as claimed in claim 6 wherein each said command generator unit comprises a multiplicity of bi-stable magnetic elements arranged in columns and rows, the signal representing a sensed instruction placing a row of magnetic elements in the corresponding command generator unit in a first magnetic state and each said timing signal applied to said command generator units being applied to a distinct row of magnetic elements to place the elements therein in a second magnetic state, each said element, when switched from said first magnetic state to said second magnetic state, generating a command signal required for the execution of an instruction.

9. The apparatus as claimed in claim 8 wherein the magnetic elements in said command generator units are magnetic core elements, each having a plurality of windings thereon, the cores in each row having similar first windings connected in series by first conductors so that all the cores in a row are set to a first magnetic state in response to a signal on one of said first conductors, the cores in each column having similar second windings connected in series by second conductors so that all the cores in a column are placed in a second magnetic state by a timing signal applied to a second conductor by said timing signal generation means, and an output winding on each core in which a command signal is induced when the state of the core is changed from said first magnetic state to said second magnetic state.

10. The apparatus as claimed in claim 9 wherein said timing signal generation means comprises two rows of bistable magnetic core elements, each having priming, resetting and output windings thereon, the output winding of each core being connected to a priming winding of a core in the other row, means to initially set one core to a first magnetic state by applying a pulse to its priming winding, and multivibrator means coupled to said resetting windings to apply signals to the resetting windings of each row of cores alternately to change the state of a core therein from a first magnetic state to a second, each core when switched to said second state inducing a signal in its output winding which primes a core in the other row and is applied as a timing pulse to the command generator units.

11. The apparatus as claimed in claim 6 wherein one of said command generator units is divided into two sections, means to apply a first consecutive group of said predetermined timing signals to said first command generator section in each machine cycle, means to apply a second consecutive group of said predetermined series of timing signals to the second command generator section in each machine cycle, means responsive to a signal generated during said first group of signals to transfer a signal representing an instruction then being processed by said first command generator section to said second command generator section, and means responsive to a signal generated during said second group of signals to transfer a signal representing a next instruction to be processed by said machine to said first command generator section.

12. The apparatus as claimed in claim 11 wherein said command generator units include a plurality of magnetic core elements, arranged in columns and rows, each having a plurality of windings thereon, the cores in each row having similar first windings connected in series by first conductors so that all the cores in a row are set to a first magnetic state in response to a signal on one of said first conductors, the cores in each column having similar second windings connected in series by second conductors so that all the cores in a column are placed in a second magnetic state by a timing signal applied to a second conductor, and an output winding on each core in which command signals are induced when the core is changed from said first magnetic state to said second magnetic state, said output windings having pluggable connections which permit variation of the conductors connected to them.

13. The apparatus as claimed in claim 12 wherein said timing signal generation means includes a timing ring comprising two rows of bistable magnetic elements, means to initially set one element to a first magnetic state, and means to apply resetting signals to said rows alternately adapted to switch elements from the first magnetic state to a second magnetic state, the ring in response to switching of an element being adapted to generate an output timing pulse and to set an element in the other row to said first magnetic state.

References Cited in the file of this patent

UNITED STATES PATENTS

| | | |
|---|---|---|
| 2,809,367 | Stuart-Williams | Oct. 8, 1957 |
| 2,820,956 | Rueger | Jan. 21, 1958 |
| 2,872,666 | Greenhalgh | Feb. 3, 1959 |
| 2,882,517 | Warren | Apr. 14, 1959 |
| 2,931,022 | Triest | Mar. 29, 1960 |
| 2,962,699 | Endres | Nov. 29, 1960 |
| 2,964,737 | Christopherson | Dec. 13, 1960 |
| 2,981,931 | Tate | Apr. 25, 1961 |
| 3,027,545 | Kodis | Mar. 27, 1962 |